(12) United States Patent
Spânu et al.

(10) Patent No.: US 10,739,959 B2
(45) Date of Patent: Aug. 11, 2020

(54) SYSTEMS AND METHODS FOR PROVIDING NARRATIVES ASSOCIATED WITH IMAGES

(71) Applicant: Facebook, Inc., Menlo Park, CA (US)

(72) Inventors: Adrian Spânu, Menlo Park, CA (US); Brady John Brayley Voss, Duvall, WA (US); Christophe Marcel Rene Tauziet, San Francisco, CA (US); Michael F. Tedesco, Sammamish, WA (US); Martin Králik, Redwood City, CA (US); James Dylan Karraker, Palo Alto, CA (US); Michael Arthur Sayman, Miami, FL (US); Joel Tyler Goguen, San Jose, CA (US)

(73) Assignee: Facebook, Inc., Menlo Park, CA (US)

(*) Notice: Subject to any disclaimer, the term of this patent is extended or adjusted under 35 U.S.C. 154(b) by 955 days.

(21) Appl. No.: 14/586,259

(22) Filed: Dec. 30, 2014

(65) Prior Publication Data
US 2016/0188557 A1 Jun. 30, 2016

(51) Int. Cl.
G06F 3/0484 (2013.01)
G06F 16/58 (2019.01)
G06Q 50/00 (2012.01)
G06Q 30/02 (2012.01)

(52) U.S. Cl.
CPC ...... *G06F 3/04842* (2013.01); *G06F 16/5866* (2019.01); *G06Q 30/0241* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,112,428 | B2* | 2/2012 | van Leuken | G06K 9/622 |
| | | | | 707/748 |
| 8,812,519 | B1* | 8/2014 | Bent | G06Q 30/0269 |
| | | | | 705/319 |
| 8,831,360 | B2* | 9/2014 | Cok | G06F 17/3028 |
| | | | | 382/224 |
| 9,460,123 | B1* | 10/2016 | Strutt | G06F 16/5838 |
| 9,843,823 | B2* | 12/2017 | Imbruce | H04N 21/23424 |
| 2003/0018667 | A1* | 1/2003 | Hoehn | G06F 17/30873 |
| | | | | 715/234 |
| 2007/0209025 | A1* | 9/2007 | Jing | G06F 17/30265 |
| 2007/0233740 | A1* | 10/2007 | Nichols | G06F 17/30038 |
| 2007/0239566 | A1* | 10/2007 | Dunnahoo | G06Q 30/0239 |
| | | | | 705/26.1 |
| 2007/0250479 | A1* | 10/2007 | Lunt | G06Q 10/10 |
| 2008/0052151 | A1* | 2/2008 | Xie | G06Q 30/02 |
| | | | | 705/14.54 |
| 2008/0120324 | A1* | 5/2008 | Davis | G06F 17/30035 |

(Continued)

Primary Examiner — Ajay M Bhatia
Assistant Examiner — Phoebe X Pan
(74) Attorney, Agent, or Firm — Sheppard Mullin Richter & Hampton LLP

(57) ABSTRACT

Systems, methods, and non-transitory computer readable media configured to provide images having associated narratives for presentation to a user. A selection by the user of a first image having an associated narrative from the images having associated narratives is received. The narrative associated with the first image is provided for presentation to the user in response to receipt of the selection of the first image.

20 Claims, 15 Drawing Sheets

(56) References Cited

U.S. PATENT DOCUMENTS

| | | | | |
|---|---|---|---|---|
| 2009/0164301 A1* | 6/2009 | O'Sullivan | G06Q 30/02 | 705/14.49 |
| 2010/0077285 A1* | 3/2010 | Bailey | G11B 27/034 | 715/201 |
| 2010/0114933 A1* | 5/2010 | Murdock | G06F 16/58 | 707/765 |
| 2010/0174993 A1* | 7/2010 | Pennington | G06F 1/1616 | 715/738 |
| 2011/0131235 A1* | 6/2011 | Petrou | G06F 17/30277 | 707/769 |
| 2011/0218846 A1* | 9/2011 | Fieldman | G06Q 30/0214 | 705/14.16 |
| 2011/0225172 A1* | 9/2011 | Liu | G06F 16/58 | 707/748 |
| 2011/0258148 A1* | 10/2011 | Gao | G06F 16/9535 | 706/12 |
| 2011/0302117 A1* | 12/2011 | Pinckney | G06Q 30/02 | 706/12 |
| 2011/0320441 A1* | 12/2011 | Lee | G06F 17/30867 | 707/723 |
| 2012/0105489 A1* | 5/2012 | Monroe | G06F 3/0482 | 345/684 |
| 2012/0272160 A1* | 10/2012 | Spivack | G06Q 10/10 | 715/752 |
| 2012/0300974 A1* | 11/2012 | Rodriguez | H04N 1/32122 | 382/100 |
| 2013/0036117 A1* | 2/2013 | Fisher | G06F 17/30029 | 707/736 |
| 2013/0332068 A1* | 12/2013 | Kesar | H04W 4/185 | 701/430 |
| 2014/0068406 A1* | 3/2014 | Kornacki | G06F 17/241 | 715/230 |
| 2014/0236720 A1* | 8/2014 | Shunock | G06Q 30/02 | 705/14.54 |
| 2014/0282013 A1* | 9/2014 | Amijee | G06F 3/0482 | 715/732 |
| 2015/0104059 A1* | 4/2015 | Dolson | G06F 16/58 | 382/100 |
| 2015/0145991 A1* | 5/2015 | Russell | H04N 7/181 | 348/143 |
| 2015/0154167 A1* | 6/2015 | Arhin | G06F 17/30386 | 715/233 |
| 2015/0294634 A1* | 10/2015 | Jung | H04L 51/32 | 345/212 |
| 2015/0312649 A1* | 10/2015 | Gopalan | H04N 21/84 | 725/32 |
| 2017/0164021 A1* | 6/2017 | Imbruce | H04N 21/23424 | |

* cited by examiner

360

362

SYSTEMS AND METHODS FOR PROVIDING NARRATIVES ASSOCIATED WITH IMAGES

FIELD OF THE INVENTION

The present technology relates to the field of content provision. More particularly, the present technology relates to techniques for providing narratives associated with images.

BACKGROUND

Today, people often utilize computing devices (or systems) for a wide variety of purposes. Users can use their computing devices, for example, to interact with one another, create content, and access content. In some cases, a user can utilize his or her computing device to share and access images.

Conventional approaches to provision of images within a social network entail various disadvantages. For example, images are often published with little accompanying information. In many instances, an image may be complemented with a short line of text in the form of a brief caption or comment. Such annotation tends to fail to communicate the entire context and meaning of the image. As another example, as social networks grow, so does the amount of their content including images. When confronted with a large array of images to view, a user of the social network may devote relatively less time to each image due to their sheer volume. When less time is allotted to an image, the significance of the image can be too easily lost on the user.

SUMMARY

Various embodiments of the present disclosure can include systems, methods, and non-transitory computer readable media configured to provide images having associated narratives for presentation to a user. A selection by the user of a first image having an associated narrative from the images having associated narratives is received. The narrative associated with the first image is provided for presentation to the user in response to receipt of the selection of the first image.

In an embodiment, the images having associated narratives are associated with video.

In an embodiment, interests of the user and subject matter reflected by the images and the associated narratives are determined. The images and the associated narratives are identified based on the interests of the user and the subject matter reflected by the images and the associated narratives.

In an embodiment, images associated with the user for which the user may choose to author narratives are identified.

In an embodiment, interests of the user are determined. Subject matter reflected by the images for which the user may choose to author narratives are determined.

In an embodiment, selection by the user of a second image for which a narrative is to be authored is received.

In an embodiment, a user input utility is provided to allow the user to author the narrative.

In an embodiment, the user is notified in response to publication of other images and associated narratives having subject matter in common with subject matter of the second image and the associated narrative.

In an embodiment, a search functionality is provided to allow a search of images and associated narratives. Results of the search are displayed in a map.

In an embodiment, an advertiser is prompted to author a narrative associated with an advertising image. The advertising image and the associated narrative to the user are presented based on interests of the user and subject matter reflected by the advertising image and the associated narrative.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
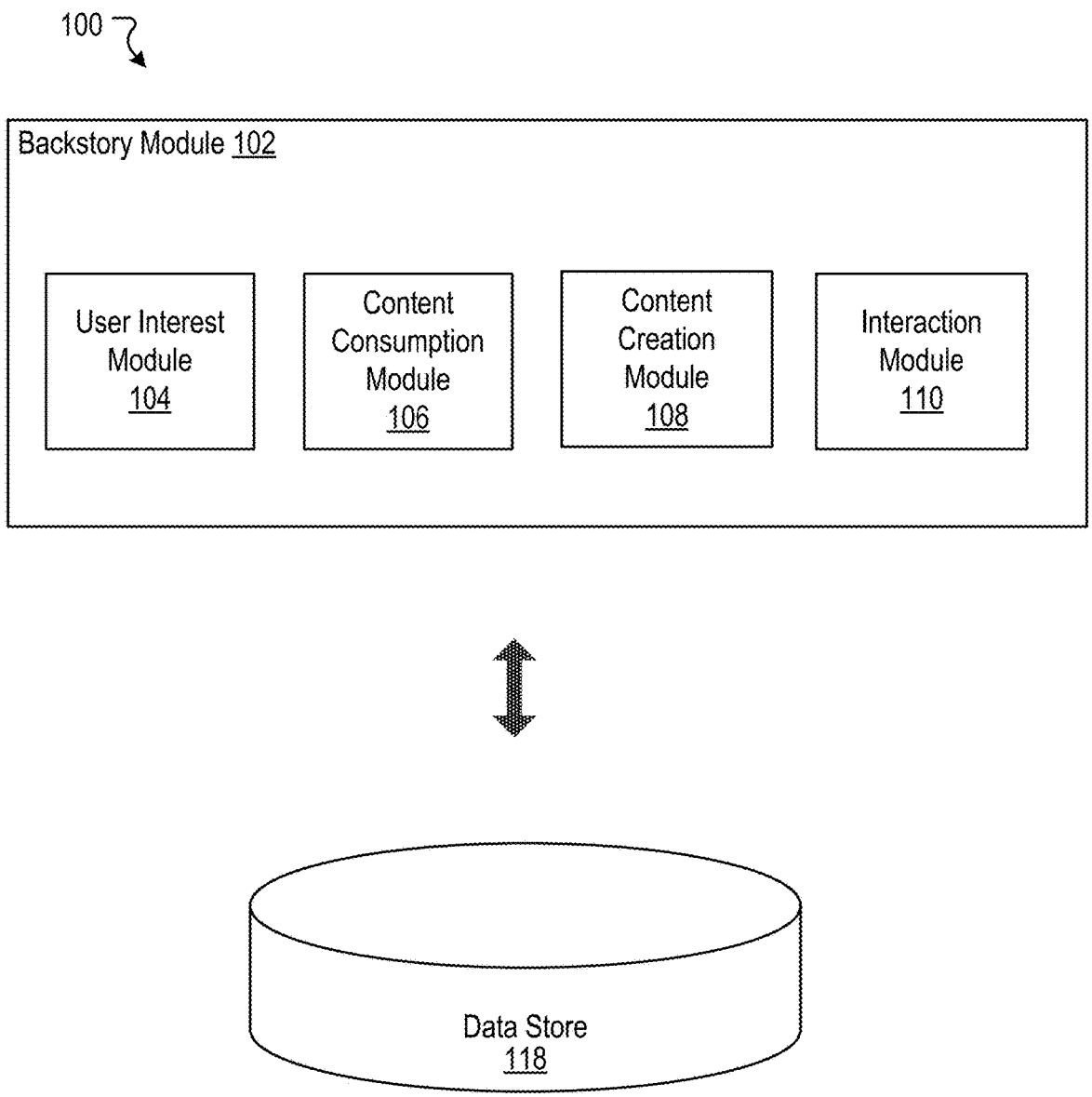
FIG. 1 illustrates a system including an example backstory module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Generating and Accessing Narratives for Images

People use computing devices (or systems) for various purposes. Computing devices can provide different kinds of functionality. Users can utilize their computing devices to produce information, access information, and share information. In some cases, users can use their computing devices to capture, share, and access images. Images can be a primary content type through which members of a social networking system communicate with one another. An image shared by a user with a social network of the user can provoke thought, elicit responses, and otherwise engender lively interaction in the social network.

Under conventional approaches, large numbers of images can be accessed by a user in a social network. Depending on access and privacy settings, the user may access images published by herself, connections of the user, and other persons or entities in a broader community of the social network. As the number of accessible images grows, the user may find it challenging to appreciate the full context, meaning, and significance of the subject matter of each image. Part of the challenge may involve the limited time that the user may have to consider one image when many images warrant consideration. Even when the user has time to appreciate a particular image, the image itself in many instances will not be sufficient to impart the full breadth of the meaning and impact of its subject matter.

An improved approach to the presentation of images overcomes the foregoing and other disadvantages associated with conventional approaches. In general, systems and methods of the present disclosure can present images associated with narratives to a user. Each image may be paired with context, explanation, significance, analysis, backstory, or other narrative that is associated with the image. The images and their associated narratives can reflect certain subject matter. The images and their associated narratives can be selectively provided to the user based on the interests of the user and their nexus to the subject matter reflected in the images and their associated narratives. When the user selects one of the presented images, the associated narrative appears for consumption by the user. In addition, the user can create narratives for images. In this regard, the user can select an image for which a narrative will be created. After selection of the image, the user can author a narrative to complement the image. When the image is later shared with others, the narrative can be consumed along with the image to potentially convey, as desired, the full scope of the meaning and impact of the subject matter depicted in the image.

FIG. 1 illustrates an example system 100 including an example backstory module 102 to allow consumption and creation of an image and associated narrative, according to an embodiment of the present disclosure. The backstory module 102 can allow any image to be paired with context, explanation, significance, analysis, backstory, or other narrative that is associated with the image. The narrative may convey more information about the subject matter relating to or reflected by the image than conveyed by the image alone. In some embodiments, the narrative may be authored by a user who created or published the image. Although an image is discussed herein, the present technology can also apply to other forms of content, such as video, audio, etc.

The backstory module 102 can include a user interest module 104, a content consumption module 106, a content creation module 108, and an interaction module 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the backstory module 102 can be implemented in any suitable combinations.

In some embodiments, the backstory module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the backstory module 102 can be implemented, in part or in whole, as software running on one or more computing devices or systems, such as on a server or client computing device. For example, the backstory module 102 can be implemented as or within a dedicated application (e.g., app), a program, or an applet running on a user computing device or client computing system. In some instances, the backstory module 102 can, in part or in whole, be implemented within or configured to operate in conjunction or be integrated with a social networking system (or service), such as the social networking system 630 of FIG. 6. It should be understood that many variations are possible.

The user interest module 104 can determine interests of a user to inform the presentation of images and their associated narratives and the selection of images for creation of narratives by the user. The user interest module 104 can monitor the interactions of the user with certain content, such as images and their associated narratives, to determine the interests of the user. The user interest module 104 also can monitor the interactions (e.g., consuming, sharing, commenting on, liking, etc.) of the user with any other types of content supported by a social networking system in general to determine the interests of the user.

The user interest module 104 can determine interests of the user based on user interactions with images and their associated narratives. If the user has consumed certain types of images, then the user interest module 104 can determine that the user has interest in subject matter reflected by those types of images. Likewise, if the user has consumed certain types of narratives, then the user interest module 104 can determine that the user has interest in subject matter reflected by those types of narratives. For example, a history of interactions can indicate that the user has consistently consumed images having black and white appearance, images depicting a certain number of persons (e.g., one person, two persons, crowds), images showing landscapes, images capturing certain locations, images showing high color saturation, images capturing certain locations or location types, etc. Such consumption of certain types of images can be signals that are indicative of user interest. As another example, a history of interactions can indicate that the user has consistently read or otherwise consumed narratives describing social events, narratives explaining social phenomena, narratives providing accounts of trips, narratives profiled individuals, narratives regarding sports, etc. Such consumption of certain types of narratives likewise can be signals that are indicative of user interest.

Content with which the user has interacted can be associated with certain topics reflective of user interest. For example, when a content item includes text, one or more natural language processing techniques can be used to identify topics from the text. As another example, when a content item includes an image, object recognition and image analysis techniques can be used to identify topics reflected by the image. In addition, comments, tags, and metadata associated with a content item can be used to identify topics reflected by the content item. A historical counter of user interactions with each topic cluster can be maintained. For each instance of a user interacting with or otherwise indicating an interest in a content item associated with a certain topic associated with a topic cluster, a counter for the topic cluster that relates to the user can be incremented. The counters for various topic clusters can provide an indication of the extent of the interest (affinity) of the user with respect to different topics. Other techniques for determining interests of the user are possible.

The content consumption module 106 can allow a user to consume images and their associated narratives. The content consumption module 106 can select images and their associated narratives for the user based on their subject matter and the interests of the user. The content consumption module 106 can present the selected images and associated narratives in an optimized manner for consumption by the user. The content consumption module 106 is described in more detail in connection with FIG. 2A.

The content creation module 108 can allow a user to select an image and author an associated narrative that can be shared with others. The content creation module 108 can facilitate selection of an image for which the user may choose to create a narrative. The content creation module 108 can generate a user interface and associated functionality to allow the user to create the narrative for a selected image. The narrative can include text as well as other images related to the selected image. The content creation module 108 is described in more detail in connection with FIG. 2B.

The interaction module 110 can facilitate various interactions with an image and associated narrative. The interaction module 110 can share the image and associated narrative with others, and facilitate responses to the image and associated narrative. The interaction module 110 can provide search functionality to users of a social networking system so that images and associated narratives can be organized and presented in response to search conditions. The interaction module 110 also can support or constitute a platform for presenting images and associated narratives provided by advertisers. The interaction module 110 is described in more detail in connection with FIG. 2C.

The data store 118 can be configured to store and maintain various types of data, such as the data relating to the consumption and creation of images and associated narratives. The data can include data relating to, for example, interests of the user, images and associated narratives, subject matter reflected by the images and associated narratives, user behavior with respect to images and associated narratives, general user behavior with respect to content on a social networking system, etc. The data also can include, for example, images for which the user may author narratives, narratives created for images, and additional images that may be selected for inclusion in the narratives. The data store 118 can also maintain other information associated with the social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the backstory module 102 can be configured to communicate and/or operate with the data store 118.

Figure 2A:
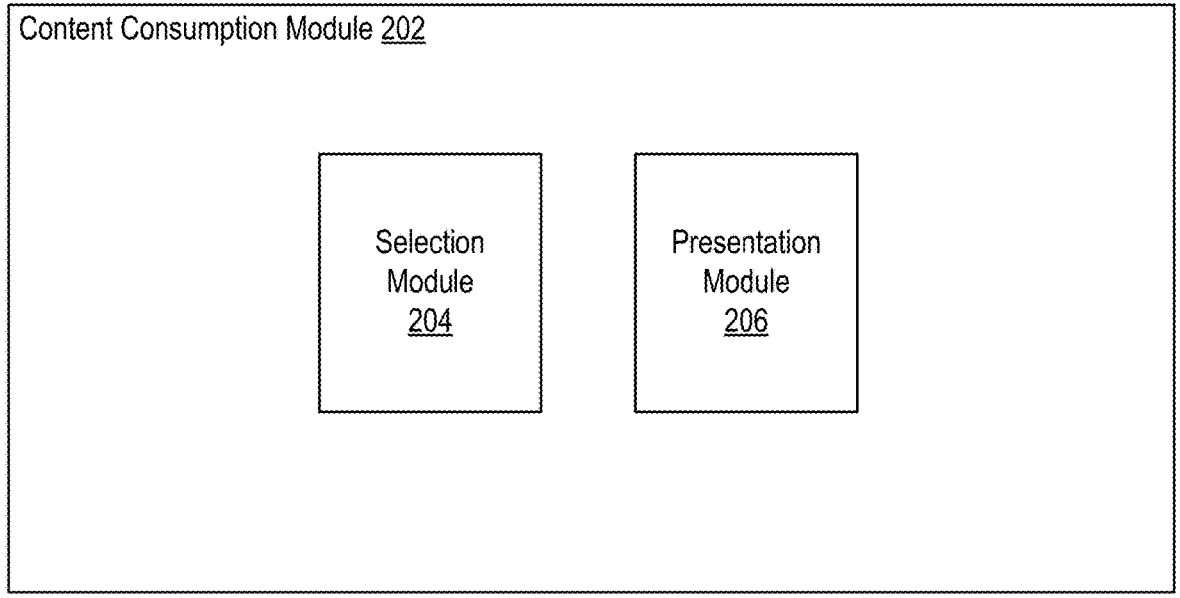
FIG. 2A illustrates an example content consumption module, according to an embodiment of the present disclosure.

FIG. 2A illustrates an example content consumption module 202, according to an embodiment of the present disclosure. In some embodiments, the content consumption module 106 of FIG. 1 can be implemented with the content consumption module 202. As shown in the example of FIG. 2A, the content consumption module 202 can include a selection module 204 and a presentation module 206.

The selection module 204 can select images associated with narratives to display to a user. The selection of images associated with narratives can be performed based on a variety of techniques. For example, the images and associated narratives of a group of members first can be identified. Then, the images and associated narratives of the group of members can be analyzed to identify their subject matter. As discussed herein, the content can be analyzed by various techniques to identify its subject matter. The identified subject matter of the images and associated narratives of the group of members can be compared to the interests of the user as determined by the user interest module 104. The images and associated narratives of the group of members having subject matter that overlaps, intersects, or correlates with the interests of the users can be selected. The images and associated narratives can be presented to the user for consumption. In some embodiments, a technique or algorithm to populate with content items a news feed of a user of a social networking system can be implemented to select images and associated narratives for presentation to the user.

The group of members from which images and associated narratives are identified for potential presentation to the user can include any members of a social networking system. The members can include any entity for which a social networking system may support a dedicated page. In some embodiments, the group of members can be members within a threshold degree of separation from the user in the social networking system. For example, the group of members can include direct connections of the user. In some embodiments, the group of members can be all of the members of the social networking system. In some embodiments, the group of members can include members selected by the user.

In some embodiments, the selection module 204 can ensure a threshold level of diversity (differentiation) in the subject matter reflected by the images and associated narratives selected for presentation. For example, the selection module 204 can identify the subject matter reflected by images initially selected for potential presentation to the user. When the identified subject matter does not satisfy the threshold level of diversity, the selection module 204 can select other images and associated narratives to vary the subject matter of the images and associated narratives. In this regard, the selection module 204 can optimize presentation of images and associated narratives for the user so that the images and associated narratives both are consistent with the interests of the user and exhibit a desirable array of subject matter.

The presentation module 206 can present to a user images and associated narratives identified by the selection module 204 in various manners. For example, the images and associated narratives can be presented in chronological order based on the time that the image or the narrative was first published on a social networking system. As another example, the images and associated narratives can be ranked based on a degree to which their subject matter correlates with the interests of the user. The images and associated narratives then can be presented according to their ranking.

The presentation module 206 can optimize the presentation of the images and the narratives in a manner that first presents images to the user before presentation of the associated narratives. For example, the images can be displayed in grid having a predetermined number of columns (e.g., two columns). When the images are displayed on screen of a mobile device of the user, the display of images can be scrolled by the user by swiping gestures. The scrolling can be performed along a direction (e.g., vertically). The user can select the image by, for example, tapping on a screen of a mobile device at the location of the displayed image. When an image is selected, an associated narrative can be presented to the user for consumption. Other techniques for presenting an image and associated narrative are possible.

In some embodiments, the presentation of the images associated with narratives can be stylized. For example, the presentation module 206 can determine the average color of each image selected for presentation to the user. The average color of each image can be calculated by taking the average RGB values of pixels in the image. Before each image is displayed for the user in its respective position in the grid, the presentation module 206 can display the average color of the image in the position. The presentation module 206 can cause the image to appear a predetermined time after display of the corresponding average color. The display of average colors for images in this manner can create a highly stylized presentation of the images to enhance user experience. Further, the display of average colors for images can reduce the impact of latency on user experience in connection with delays resulting from downloading the images to a mobile device.

A narrative associated with an image can be presented for consumption by the user after selection of the image. In some embodiments, the presentation of the narrative after presentation of the associated image is delayed until a predetermined event occurs or predetermined time passes. For instance, a narrative associated with an image is not displayed until after presentation of the image and after selection of the image by the user. After selection of the image, the presentation module 206 can present a full screen, scrollable view of the selected image and remove the appearance of other images. An identification of the member who published the image and authored the associated narrative can be displayed on the selected image. The identification can include, for example, an image of the member and the name of the member. In addition, the presentation module 206 can display on the selected image a title of the associated narrative and a date. The date can be any date related to the image and associated narrative, such as the date the image was captured, the date the narrative was authored, or the date relating to subject matter reflected in the image or narrative. In some instances, some portion of the selected image can be blurred or faded where the identification of the member is displayed.

The presentation module 206 can allow the selected image to be scrolled in a direction (e.g., vertically) to display the associated narrative. The narrative may be positioned below the image so that, when scrolling in a vertical direction (e.g., up), more of the narrative appears on the screen as more of the selected image disappears from the screen. The narrative can be any number of words and be of any length. When the extent of the narrative is larger than the screen of the mobile device, the user can appropriately scroll to view previously hidden portions of the narrative.

The presentation module 206 can present portions of the narrative interspersed with other images. The other images can directly or indirectly relate to subject matter reflected by the selected original image or associated narrative. For example, if the original image relates to a general category of subject matter, the other images interspersed within the narrative can relate to specific categories of the subject matter. As another example, if the selected image reflects subject matter at a certain point in time, the other images interspersed within the narrative can relate to the subject matter at adjacent points in time.

Figure 2B:
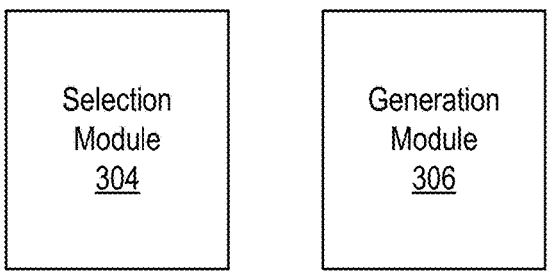
FIG. 2B illustrates an example content creation module, according to an embodiment of the present disclosure.

FIG. 2B illustrates an example content creation module 302, according to an embodiment of the present disclosure. In some embodiments, the content creation module 108 of FIG. 1 can be implemented with the content creation module 302. As shown in the example of FIG. 2B, the content creation module 302 can include a selection module 304 and a generation module 306.

The selection module 304 can support the selection of an image for which a narrative will be authored by a user. The selection module 304 can access from a variety of sources images associated with the user for which the user could potentially author narratives. For example, the images can be maintained in an image repository (e.g., camera roll) of a mobile device or associated with an account of the user with the social networking system. The selection module 304 can present an indication (e.g., thumbnails) of such images to the user for potential selection by the user. The user may select one or more of the images for which to author a narrative.

In some embodiments, the selection module 304 can prompt the user to focus on one or more images from all of the images for which the user could potentially author narratives. The selection module 304 can identify the subject matter reflected in all (or some) of the images for which the user could author narratives. As discussed herein, subject matter of images can be identified by a variety of techniques. The identified subject matter of the images can be compared to the interests of the user as determined by the user interest module 104. The images having subject matter that overlaps, intersects, or correlates with the interests of the users can be identified as images in which the user may have most interest or enthusiasm. The selection module 304 accordingly can emphasize or otherwise highlight these images for the user as images that might be especially suited for the authoring of narratives.

The generation module 306 can allow the user to author a narrative after the user selects an image. After selection of the image, the generation module 306 can present the selected image and automatically display thereon an identification (e.g., name) of the user and the current date. The generation module 206 also can display a keyboard or other input system (e.g., audio entry system) along with fields of information to populate using the input system. For example, a first field can be a short field to prompt the user to enter a title for the narrative. As another example, a second field can be a long field to prompt the user to author the narrative associated with the image. When the user provides the prompted information in the fields, the generation module 306 can provide a button or other functionality to save the authored information.

In some embodiments, the generation module 306 can allow the user to provide additional information or functionality to the narrative or associated image. For example, the generation module 306 can provide functionality to allow the user to add images relating to the original image for which a narrative is created at desired locations within the narrative. As another example, the generation module 306 can allow the user to add tags to the narrative or related images, or can automatically suggest or include tags.

Figure 2C:
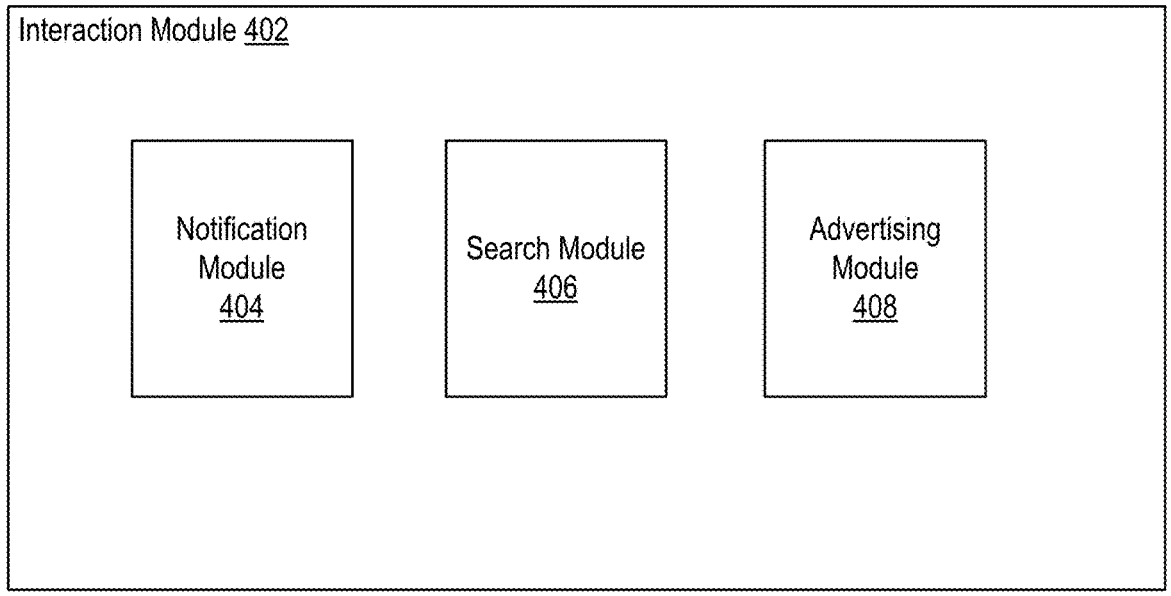
FIG. 2C illustrates an example interaction module, according to an embodiment of the present disclosure.

FIG. 2C illustrates an example interaction module 402, according to an embodiment of the present disclosure. In some embodiments, the interaction module 402 of FIG. 2C can be implemented with the interaction module 110. As shown in the example of FIG. 2C, the interaction module 402 can include a notification module 404, a search module 406, and an advertising module 408.

The notification module 404 can provide notifications regarding an image and associated narrative. The notifications are subject to appropriate privacy settings that can be selected by the user who published the image and associated narrative. For example, the notification module 404 can provide notifications to entities that have been identified or tagged in the image or associated narrative.

As another example, when an image and associated narrative are published, the notification module 404 can provide a notification about the image and associated narrative to other members of a social networking system who may have interest in the subject matter of the image and associated narrative. For instance, the notification can invite the other members to consume the image and associated narrative. As another example, the notification also can invite the other members to publish their own images and associated narratives that reflect subject matter related to the subject matter of the original image and associated narrative. When other members publish images and associated narratives having subject matter that is related to the subject matter of the original image and associated narrative, the notification module 404 can notify the user who published the original image and associated narrative about the publication of related images and associated narratives.

The search module 406 can allow a user to search images and associated narratives. For example, the images and associated narratives can be indexed by tags. The tags can reflect any aspect of the images and associated narratives. The tags can be generated based on, for example, input of users who published the images and associated narratives and machine based content analysis techniques. In some embodiments, searches can be conducted based at least in part on the tags. Other techniques to search images and associated narratives are possible.

The search module 406 can provide a search utility to allow a user to enter search requests. If a user wishes to consume all images and associated narratives associated with a particular subject matter, the user can enter the subject matter into the search utility. The search module 406 can use the entered subject matter as search conditions and return images and associated narratives that satisfy the search conditions.

The search module 406 can organize and present search results in a variety of manners. For example, when images and associated narratives constituting search results for a particular search have geolocational components, the search results can be displayed in a map or other distribution based on their geolocational components. In one instance, if a user performs a search for content that relates to a geolocation area, the search module 406 can collect all relevant images and associated narratives that have subject matter relating to the area. The geolocation points for each of the relevant images and associated narratives can be determined. The images and associated narratives can be displayed in a map of the area based on their specific geolocation points. In one instance, an image can be displayed at each corresponding geolocation point of the area and the user can select the image to consume the associated narrative. In another instance, when the location of the user can be determined, the search module 406 can display an image when the user travels to a geolocation point associated with the image. Likewise, as another example, when images and associated narratives constituting search results for a particular search have time components, the search results can be displayed in a map or other distribution based on their particular times.

In some embodiments, the search module 406 can return search results that include content (e.g., articles) from publishers of content, such as news organizations, lifestyle periodicals, interest journals, etc. The search module 406 can obtain content from publishers that contain both images and narratives or other long forms of text. Such content can be shared by the publishers on a social networking system. The images and their associated narratives can be analyzed to determine their subject matter and appropriate tags so that they can be searched. In some embodiments, the search module 406 can include images and associated narratives from content publishers in search results to supplement search results containing content from connections of the user.

The advertising module 408 can support the creation and presentation of images and associated narratives from advertisers. Advertisers can interact with the backstory module 102 as an advertising platform. Advertisers can be prompted to upload images and create narratives for presentation to users. The subject matter of the images and associated narratives published by advertisers can be analyzed and determined, as discussed herein. Based on their subject matter, the images and associated narratives can be selectively presented to users having interest in such subject matter. The advertising module 408 can support the uploading of images of advertisers that are similar to the types of images uploaded by members of the social networking system. For example, the images uploaded by advertisers may promote general brand awareness for the advertiser. As another example, the images uploaded by advertisers may promote specific goods or services. When selected by a user, the image published by the advertiser may be displayed along with the narrative authored by the advertiser.

FIGS. 3A-3G illustrate example screens of a user interface of a computing system for presenting or utilizing various components and features of the present disclosure, according to an embodiment of the present disclosure. In some embodiments, the computing system can be a mobile device.

Figure 3A:
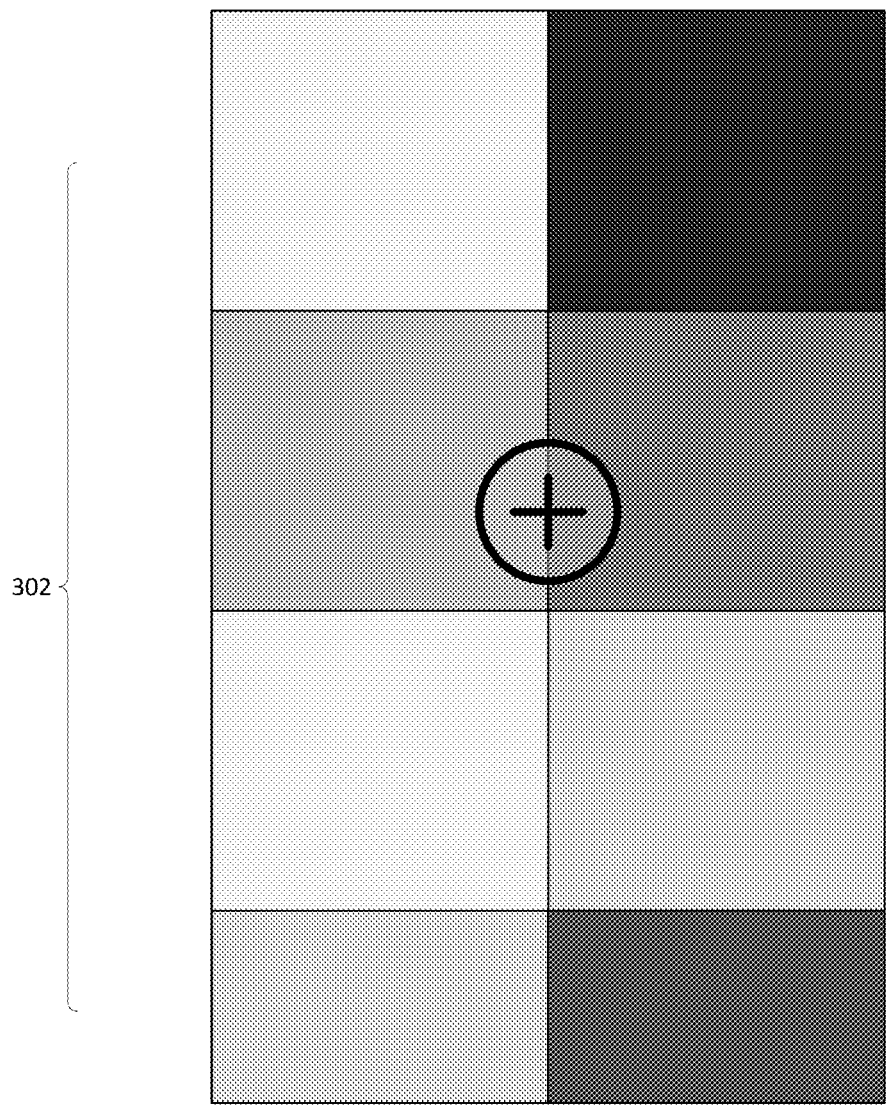
FIGS. 3A-3G illustrate example screens, according to an embodiment of the present disclosure.

FIG. 3A shows a screen 300 prior to presentation of images and associated narratives for consumption. The images to be displayed on the screen 300 can be assigned to cells within a grid 302. In some embodiments, each cell can display a color or shading that represents an average color or shading of a corresponding image.

Figure 3B:
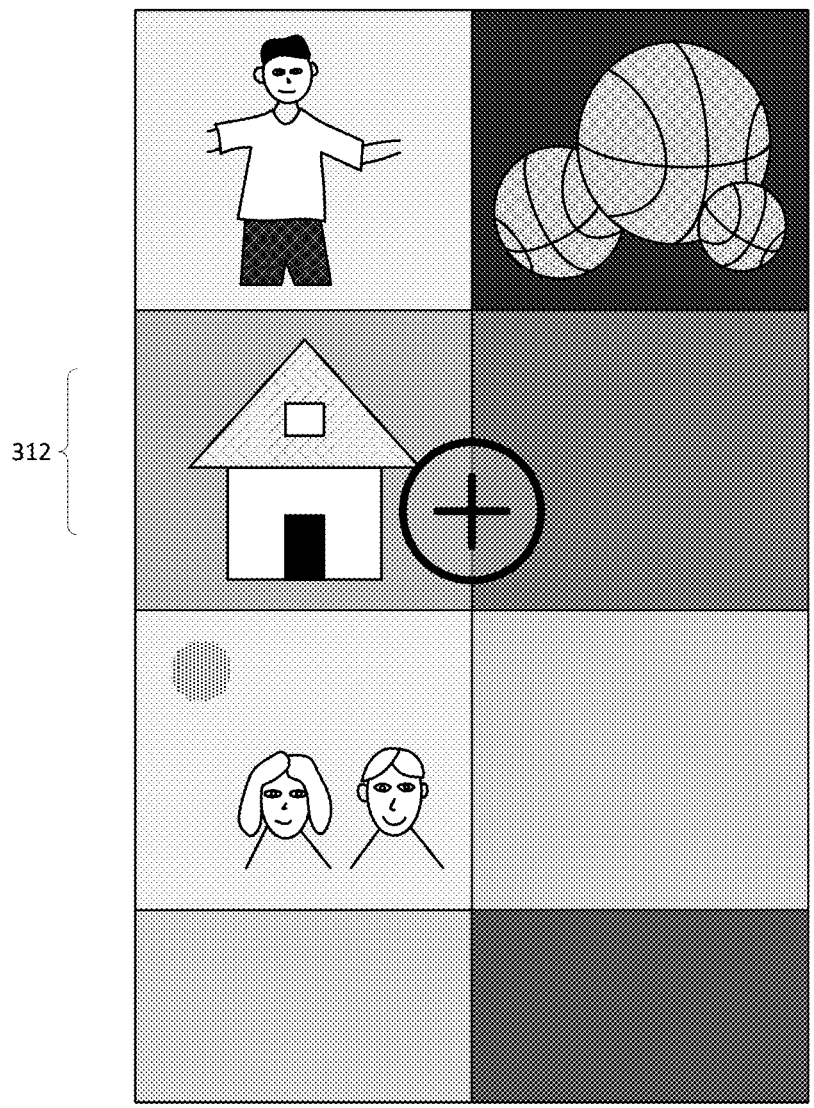

FIG. 3B shows a screen 310 that displays some images downloaded on the computing device and presented to the user. For example, an image 312 is one of the images presented to the user after a determination that it and its associated narrative reflect subject matter that is of interest to the user. In some embodiments, the images may be displayed on the screen 310 in a sequential manner. In some embodiments, the images can be positioned in the grid according to chronology based on the dates that the image or associated narrative was published or based on correlation between their subject matter and user intereset. Each of the images presented to the user can be selected by the user to display an associated narrative. Scrolling downward can present more images to the user.

Figure 3C:
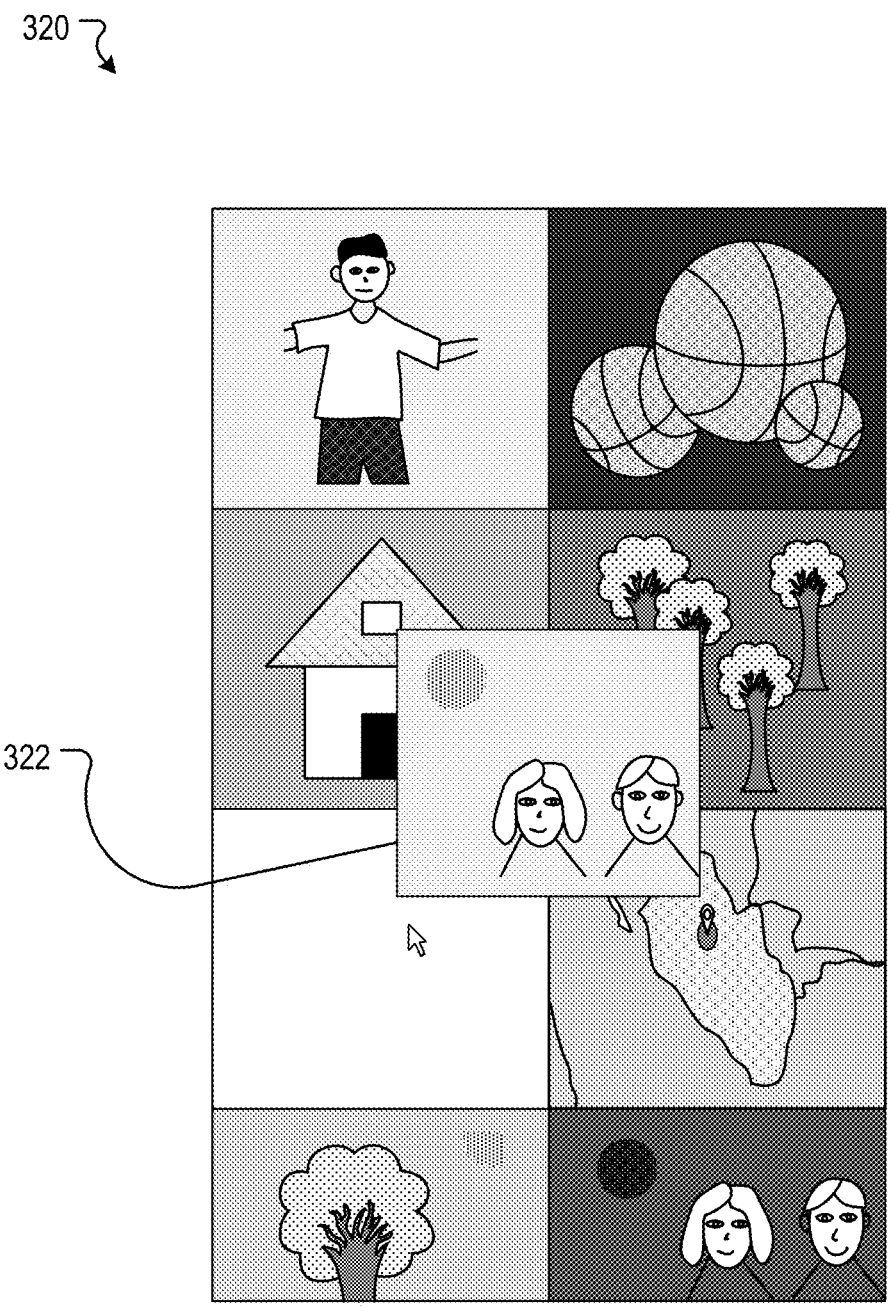

FIG. 3C shows a screen 320 that displays a user selection of an image 322 after all images to be presented to the user are displayed on the screen 320. Selection of the image 322 may be performed by a tap or other suitable gesture. Movement of the image 322 may be animated so that the image moves toward the center of the screen 320 after selection.

Figure 3D:
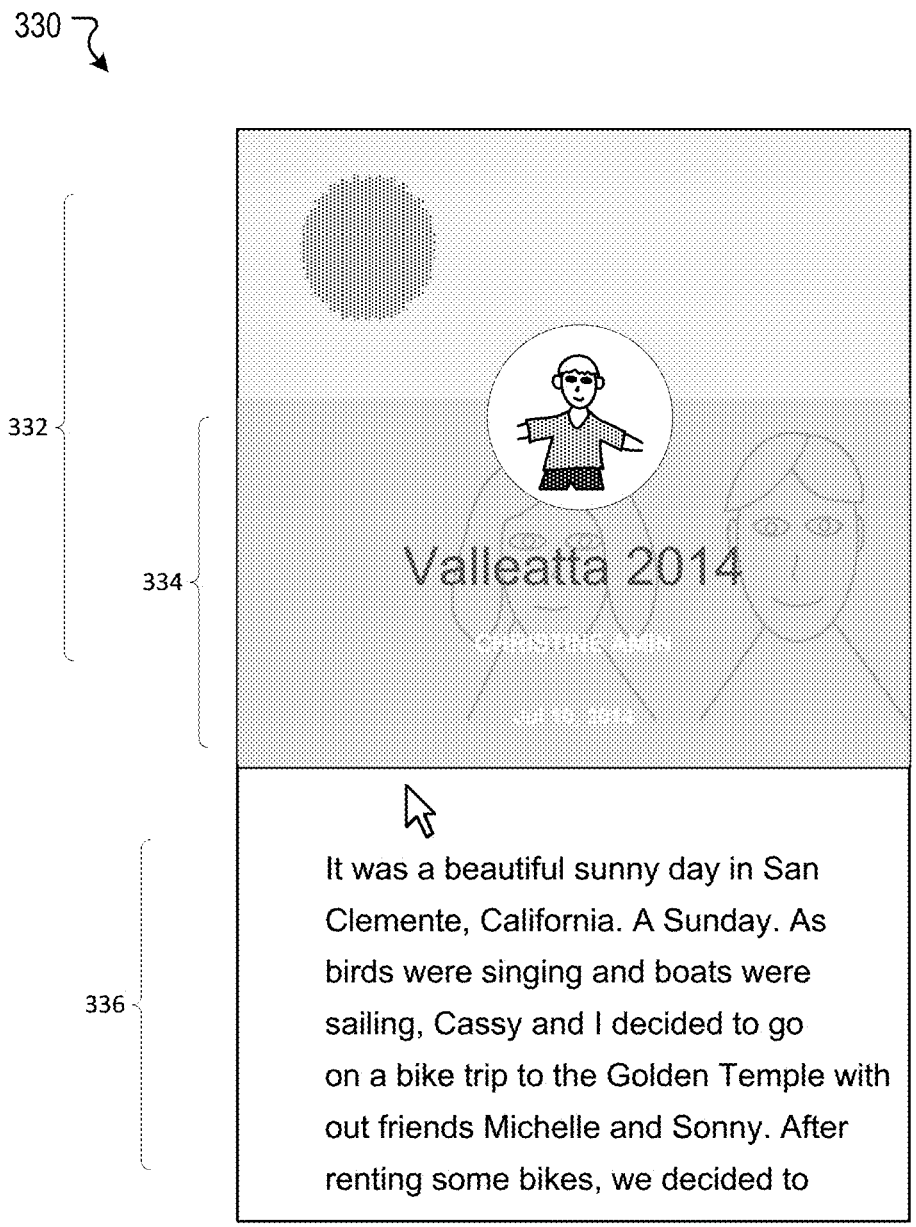

FIG. 3D shows a screen 330 that includes a region 332 that displays the image selected by the user. The region 332 includes a region 334 that provides identification information in relation to the image and associated narrative. The identification information can include a title for the narrative, the name of the entity who published it, an image of the entity, and the date of publication. In some instances, the image selected by the user may be blurred or faded in the region 334 so that the identification information can be more prominently displayed. The screen 330 includes a region 336 that displays the narrative. When the extent of the narrative exceeds the area of the screen 330, the screen 330 can be scrolled downward to show additional portions of the narrative.

Figure 3E:
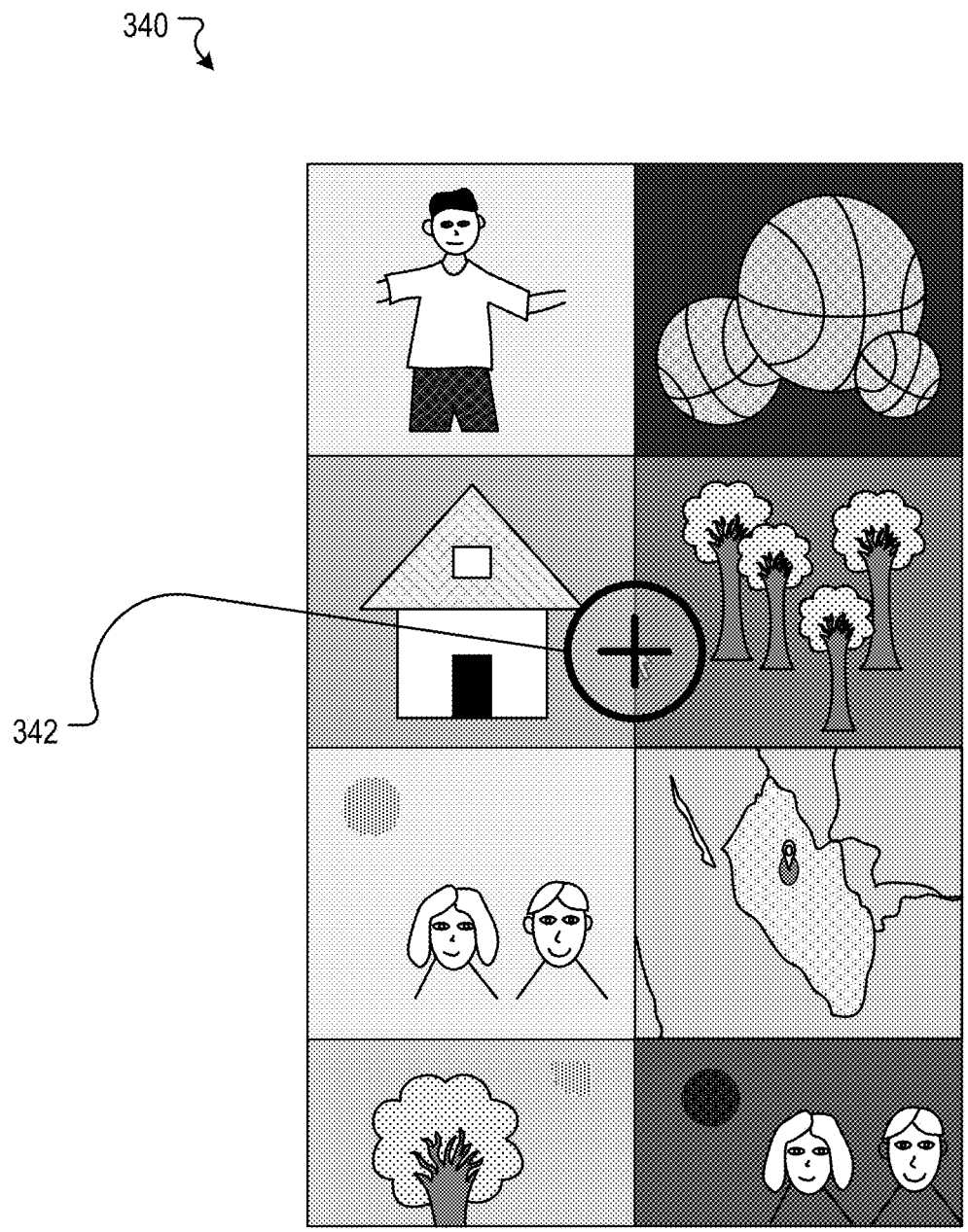

FIG. 3E shows a screen 340 that includes a button 342 to allow creation of a narrative associated with an image. When the button 342 is selected, the user may be directed to a repository of images from which an image can be selected for the authoring of a related narrative.

Figure 3F:
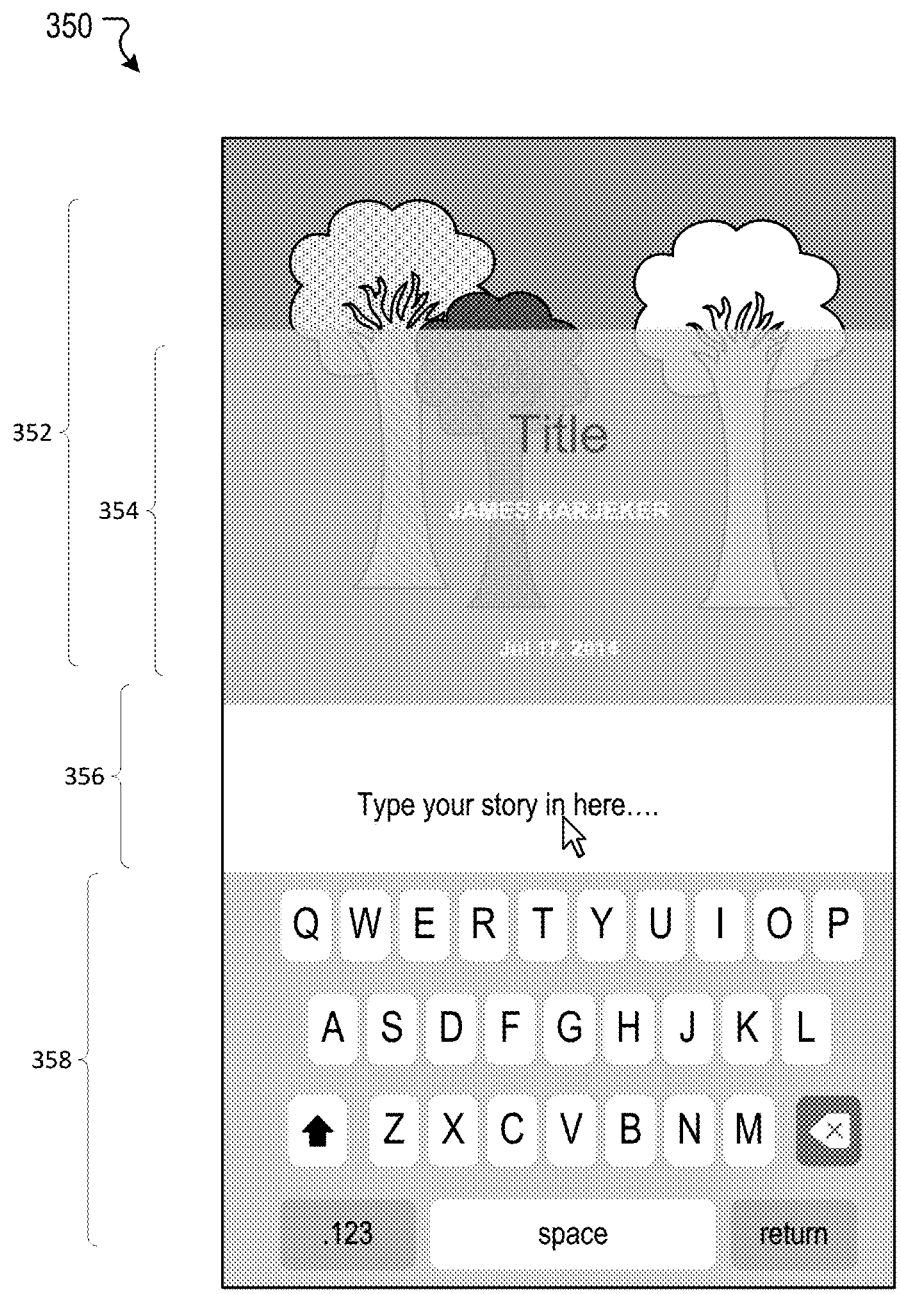

FIG. 3F shows a screen 350 that displays creation of a narrative associated with an image selected by a user. A region 352 displays the image. The region 352 may include a region 354 that displays identification information about the image and associated narrative. Some of the identification information (e.g., author name and date) can be automatically populated and other identification information (e.g., title of narrative) can be entered by the user. A region 356 shows the narrative as the user authors it. A region 358 displays a user input utility with which to enter the title and author the narrative.

Figure 3G:
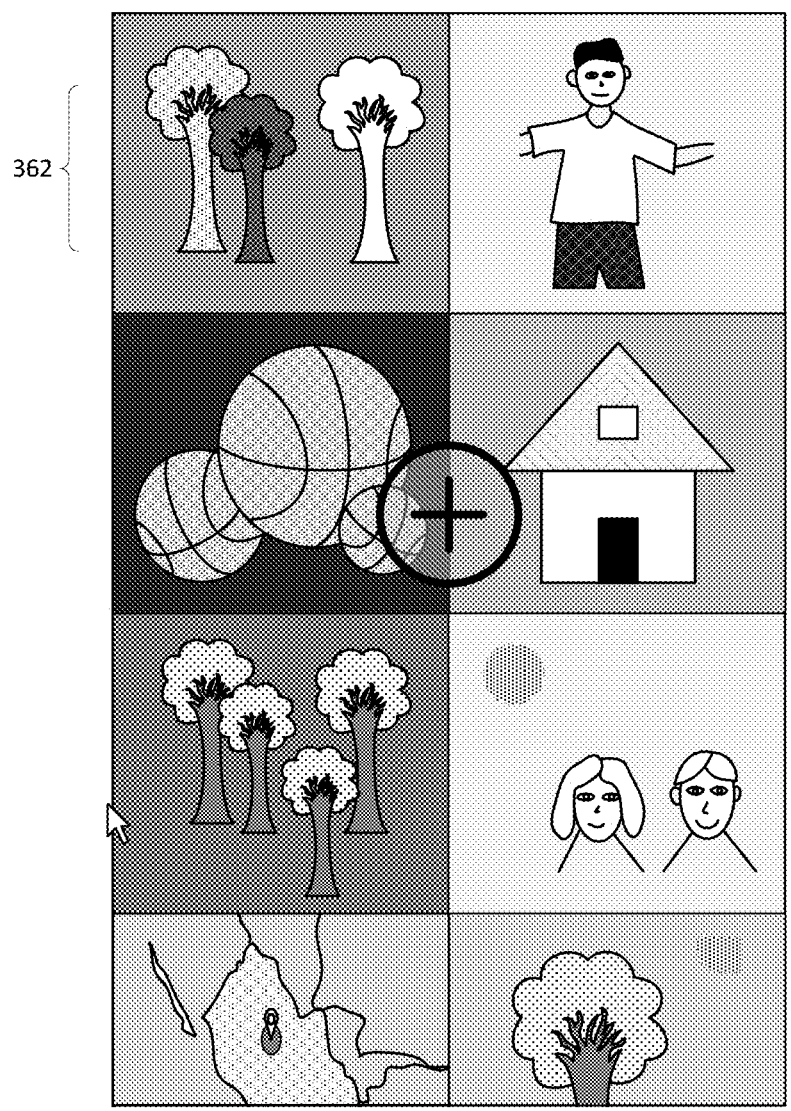

FIG. 3G shows a screen 360 that displays for a user an image 362 for which a narrative has been newly created. The image 362 appears in the grid at the first position because it is most recently created among the displayed images. When selected by the user, the associated narrative can be displayed to the user for consumption.

Figure 4:
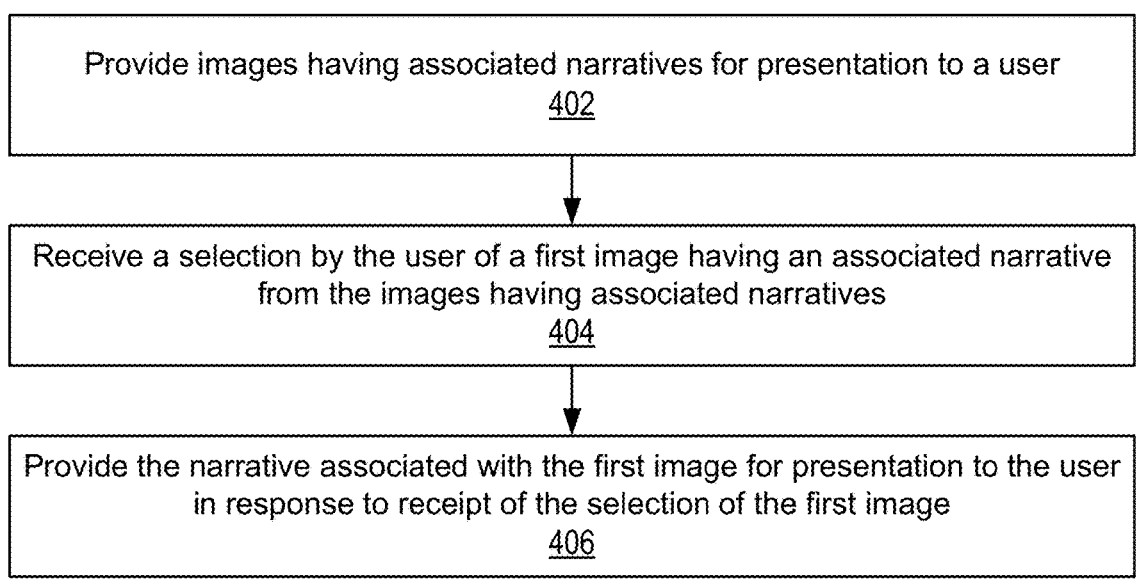
FIG. 4 illustrates an example method of consuming an image and associated narrative, according to an embodiment of the present disclosure.

FIG. 4 illustrates an example method 400, according to an embodiment of the present disclosure. It should be appreciated that there can be additional, fewer, or alternative steps performed in similar or alternative orders, or in parallel, within the scope of the various embodiments unless otherwise stated.

At block 402, the method 400 can provide images having associated narratives for presentation to a user. At block 404, the method 400 can receive a selection by the user of a first image having an associated narrative from the images having associated narratives. At block 406, the method 400 can provide the narrative associated with the first image for presentation to the user in response to receipt of the selection of the first image. Other suitable techniques that incorporate various features and embodiments of the present technology are possible.

Figure 5:
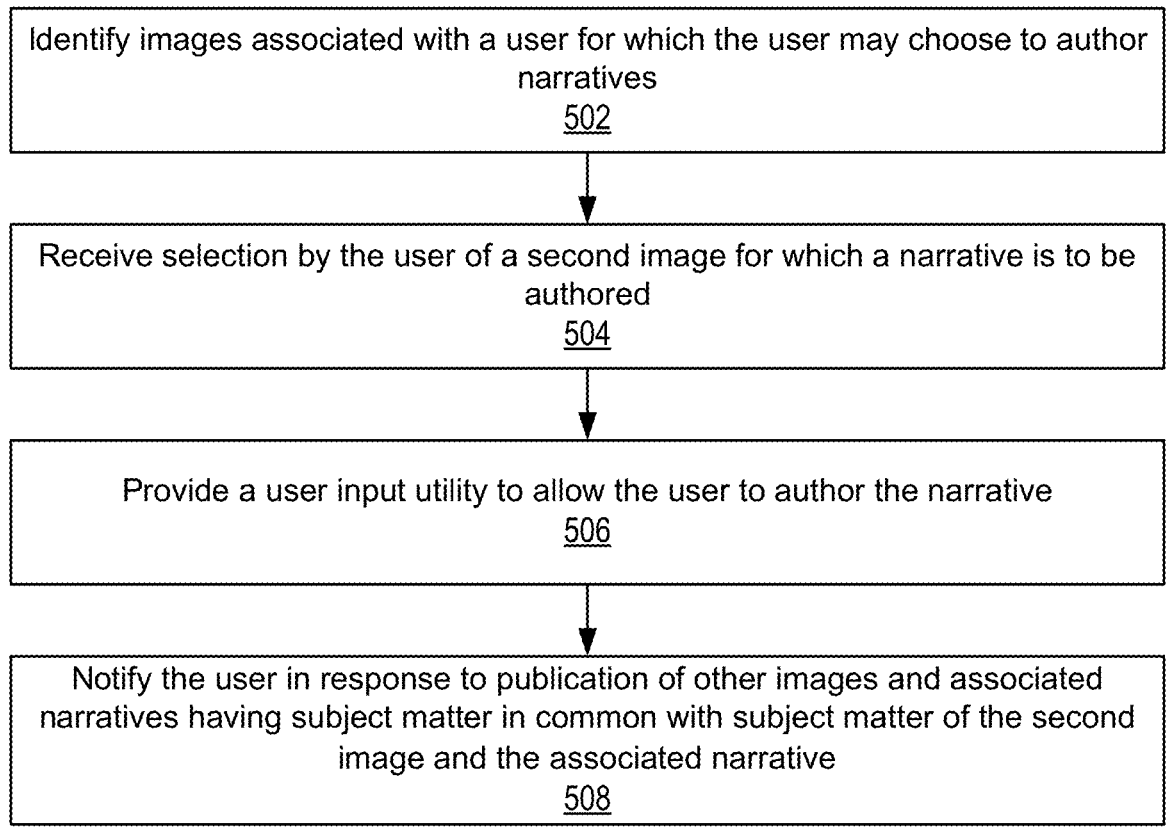
FIG. 5 illustrates an example method of creating a narrative associated with an image, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can identify images associated with a user for which the user may choose to author narratives. At block 504, the method 500 can receive selection by the user of a second image for which a narrative is to be authored. At block 506, the method 500 can provide a user input utility to allow the user to author the narrative. At block 508, the method 500 can notify the user in response to publication of other images and associated narratives having subject matter in common with subject matter of the second image and the associated narrative. Other suitable techniques that incorporate various features and embodiments of the present technology are possible.

Social Networking System—Example Implementation

Figure 6:
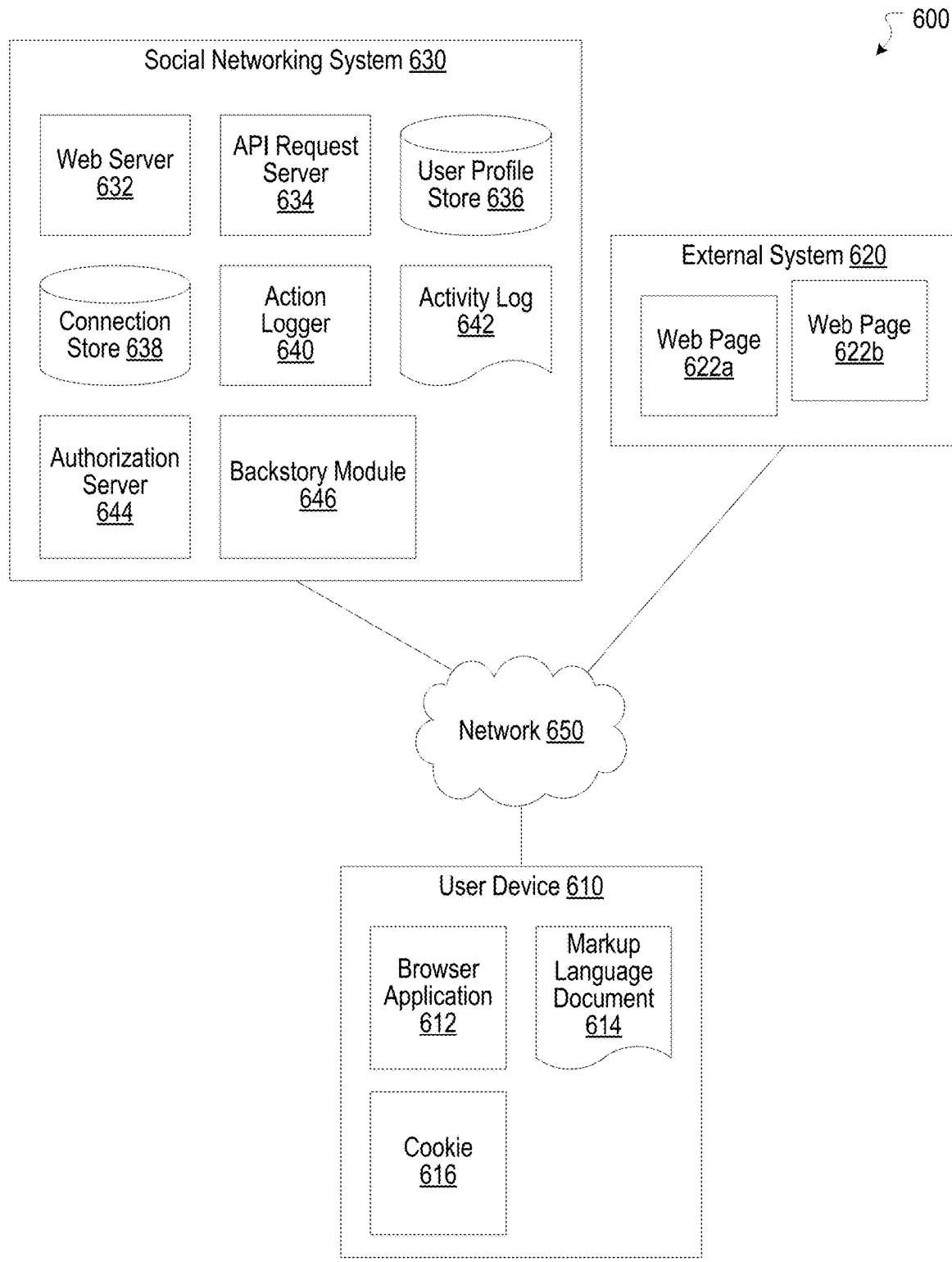
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a backstory module 646. The backstory module 646 can be implemented with the backstory module 102.

Hardware Implementation

Figure 7:
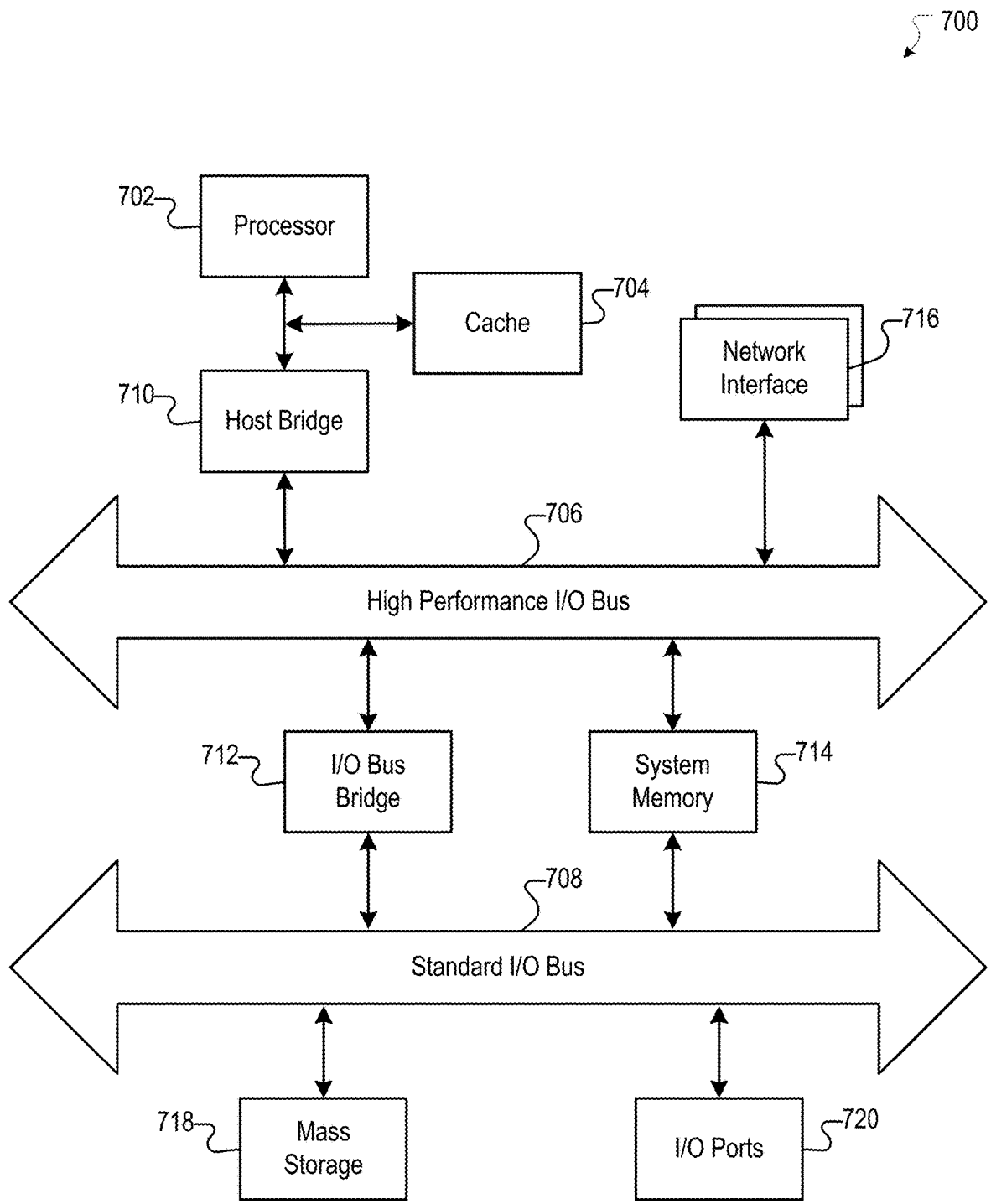
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, one or more interests of a first user based at least in part on a historical counter of user interactions with one or more topic clusters;
   determining, by the computing system, images having associated text narratives for presentation to the first user based at least in part on the one or more interests of the first user, wherein the images satisfy a threshold level of diversity associated with subject matter of the images;
   providing, by the computing system, the images having associated text narratives for presentation to the first user, wherein the images are presented in a grid interface without the associated text narratives and wherein the presentation is based at least in part on a ranking determined at least in part on the one or more interests of the first user;
   receiving, by the computing system, a first selection by the first user of a first image having an associated text narrative from the images having associated text narratives;
   providing, by the computing system, the text narrative associated with the first image for presentation to the first user in response to receipt of the selection of the first image;
   providing, by the computing system, an option to add one or more new images related to the first image;
   receiving, by the computing system, the one or more new images; and
   notifying, by the computing system, a second user associated with publishing the first image that the one or more new images have been added.

2. The computer-implemented method of claim 1, wherein the images having associated text narratives are associated with one or more videos.

3. The computer-implemented method of claim 1, further comprising:
   determining the one or more interests of the first user and the subject matter of the images having associated text narratives; and
   ranking the images having associated text narratives based at least in part on a degree to which the subject matter of the images correlate with the one or more interests of the first user.

4. The computer-implemented method of claim 1, further comprising:
   identifying images associated with the first user for which the first user may choose to author text narratives.

5. The computer-implemented method of claim 4, further comprising:
   determining a reflected subject matter reflected by the images for which the first user may choose to author text narratives.

6. The computer-implemented method of claim 4, further comprising:
   receiving a second selection by the first user of a second image for which an authored text narrative is to be authored.

7. The computer-implemented method of claim 6, further comprising:
   providing an user input utility to allow the first user to author the authored text narrative.

8. The computer-implemented method of claim 6, further comprising:
   notifying the first user in response to publication of other images having associated text narratives, wherein subject matter of the other images are in common with a subject matter of the second image or the authored text narrative.

9. The computer-implemented method of claim 1, further comprising:
   providing a search functionality to allow a search of the images having associated text narratives; and
   displaying results of the search in a map.

10. The computer-implemented method of claim 1, further comprising:
    prompting an advertiser to author an advertising text narrative associated with an advertising image; and
    presenting the advertising image and the associated advertising text narrative to the first user based on the one or more interests of the first user and the subject matter of the images.

11. A system comprising:
    at least one processor; and a memory storing instructions that, when executed by the at least one processor, cause the system to perform:
   determining one or more interests of a first user based at least in part on a historical counter of user interactions with one or more topic clusters;
   determining images having associated text narratives for presentation to the first user based at least in part on the one or more interests of the first user, wherein the images satisfy a threshold level of diversity associated with subject matter of the images;
   providing the images having associated text narratives for presentation to the first user, wherein the images are presented in a grid interface without the associated text narratives and wherein the presentation is based at least in part on a ranking determined at least in part on the one or more interests of the first user;
   receiving a first selection by the first user of a first image having an associated text narrative from the images having associated text narratives;
   providing the text narrative associated with the first image for presentation to the user in response to receipt of the selection of the first image;
   providing an option to add one or more new images related to the first image;
   receiving the one or more new images; and
   notifying a second user associated with publishing the first image that the one or more new images have been added.

12. The system of claim 11, wherein the images having associated text narratives are associated with one or more videos.

13. The system of claim 11, further comprising:
   determining the one or more interests of the first user and the subject matter of the images having associated text narratives; and
   ranking the images having associated text narratives based at least in part on a degree to which the subject matter of the images correlate with the one or more interests of the first user.

14. The system of claim 11, further comprising:
   identifying images associated with the first user for which the first user may choose to author text narratives.

15. The system of claim 11, further comprising:
   receiving a second selection by the first user of a second image for which an authored text narrative is to be authored.

16. A non-transitory computer-readable storage medium including instructions that, when executed by at least one processor of a computing system, cause the computing system to perform a method comprising:
   determining one or more interests of a first user based at least in part on a historical counter of user interactions with one or more topic clusters;
   determining images having associated text narratives for presentation to the first user based at least in part on the one or more interests of the first user, wherein the images satisfy a threshold level of diversity associated with subject matter of the images;
   providing the images having associated text narratives for presentation to the first user, wherein the images are presented in a grid interface without the associated text narratives and wherein the presentation is based at least in part on a ranking determined at least in part on the one or more interests of the first user;
   receiving a first selection by the first user of a first image having an associated text narrative from the images having associated text narratives;
   providing the text narrative associated with the first image for presentation to the first user in response to receipt of the selection of the first image;
   providing an option to add one or more new images related to the first image;
   receiving the one or more new images; and
   notifying a second user associated with publishing the first image that the one or more new images have been added.

17. The non-transitory computer-readable storage medium of claim 16, wherein the images having associated text narratives are associated with one or more videos.

18. The non-transitory computer-readable storage medium of claim 16, further comprising:
   determining the one or more interests of the first user and the subject matter of the images having associated text narratives; and
   ranking the images having associated text narratives based at least in part on a degree to which the subject matter correlate with the one or more interests of the first user.

19. The non-transitory computer-readable storage medium of claim 16, further comprising:
   identifying images associated with the first user for which the first user may choose to author text narratives.

20. The non-transitory computer-readable storage medium of claim 16, further comprising:
   receiving a second selection by the first user of a second image for which an authored text narrative is to be authored.

* * * * *